(12) United States Patent
Heap et al.

(10) Patent No.: US 8,010,247 B2
(45) Date of Patent: Aug. 30, 2011

(54) METHOD FOR OPERATING AN ENGINE IN A HYBRID POWERTRAIN SYSTEM

(75) Inventors: Anthony H. Heap, Ann Arbor, MI (US); John L. Lahti, Novi, MI (US); Anthony James Corsetti, Royal Oak, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 359 days.

(21) Appl. No.: 12/253,221

(22) Filed: Oct. 16, 2008

(65) Prior Publication Data

US 2009/0118883 A1 May 7, 2009

Related U.S. Application Data

(60) Provisional application No. 60/985,218, filed on Nov. 3, 2007.

(51) Int. Cl.
*B60W 10/04* (2006.01)
*G06F 17/00* (2006.01)

(52) U.S. Cl. ............. 701/22; 180/65.275; 180/65.265

(58) Field of Classification Search ............ 701/51, 701/22, 99, 103; 180/65.265, 65.1, 65.3, 180/65.4, 65.275; 290/45
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |

(Continued)

*Primary Examiner* — Thomas G Black
*Assistant Examiner* — Marthe Marc Coleman

(57) ABSTRACT

An engine and an electric machine are operative to communicate tractive power with a transmission device to control output power to an output member. The electric machine is electrically coupled to an energy storage device. A method for controlling the engine and electric machine includes monitoring an operator request for power, monitoring a state of charge of the energy storage device, determining an operating cost for each of a plurality of candidate engine operating points based on the operator request for power and the state of charge of the energy storage device; and operating the engine at the candidate engine operating point having a preferred operating cost.

17 Claims, 6 Drawing Sheets

U.S. PATENT DOCUMENTS

| | | |
|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0037578 A1* | 2/2006 | Nakamura ............... 123/198 F |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0059013 A1* | 3/2008 | Liu et al. .................... 701/22 |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0122228 A1* | 5/2008 | Liu et al. .................. 290/40 C |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |

| | | | | | | |
|---|---|---|---|---|---|---|
| 2009/0118936 | A1 | 5/2009 | Heap | 2009/0118950 A1 | 5/2009 | Heap |
| 2009/0118937 | A1 | 5/2009 | Heap | 2009/0118951 A1 | 5/2009 | Heap |
| 2009/0118938 | A1 | 5/2009 | Heap | 2009/0118952 A1 | 5/2009 | Heap |
| 2009/0118939 | A1 | 5/2009 | Heap | 2009/0118954 A1 | 5/2009 | Wu |
| 2009/0118940 | A1 | 5/2009 | Heap | 2009/0118957 A1 | 5/2009 | Heap |
| 2009/0118941 | A1 | 5/2009 | Heap | 2009/0118962 A1 | 5/2009 | Heap |
| 2009/0118942 | A1 | 5/2009 | Hsieh | 2009/0118963 A1 | 5/2009 | Heap |
| 2009/0118943 | A1 | 5/2009 | Heap | 2009/0118964 A1 | 5/2009 | Snyder |
| 2009/0118944 | A1 | 5/2009 | Heap | 2009/0118969 A1 | 5/2009 | Heap |
| 2009/0118945 | A1 | 5/2009 | Heap | 2009/0118971 A1 | 5/2009 | Heap |
| 2009/0118946 | A1 | 5/2009 | Heap | 2009/0118999 A1 | 5/2009 | Heap |
| 2009/0118947 | A1 | 5/2009 | Heap | 2009/0144002 A1 | 6/2009 | Zettel |
| 2009/0118948 | A1 | 5/2009 | Heap | | | |
| 2009/0118949 | A1 | 5/2009 | Heap | | | |

\* cited by examiner

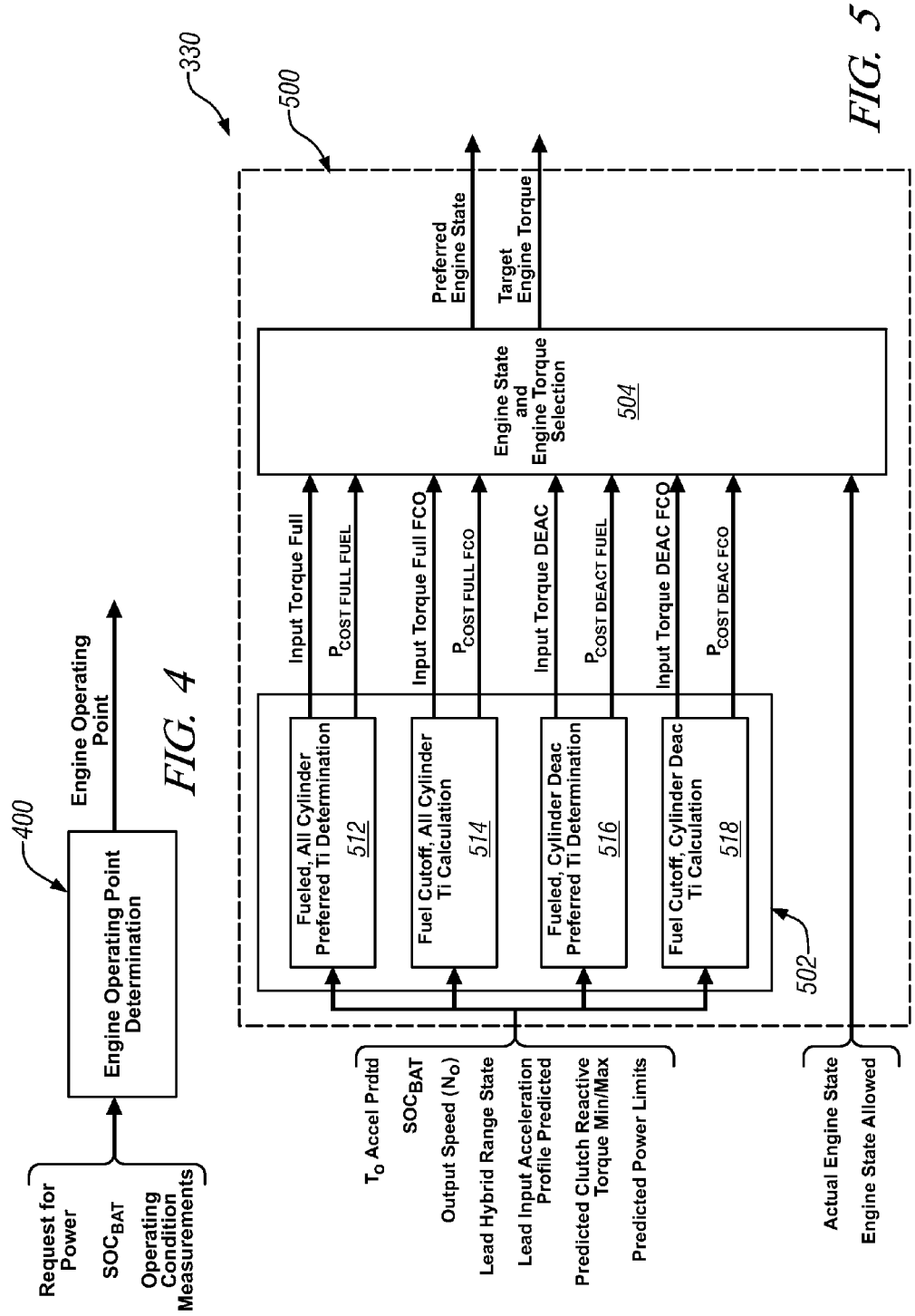

METHOD FOR OPERATING AN ENGINE IN A HYBRID POWERTRAIN SYSTEM

CROSS REFERENCE TO RELATED APPLICATION

This application claims the benefit of U.S. Provisional Application No. 60/985,218 filed on Nov. 3, 2007 which is hereby incorporated herein by reference.

TECHNICAL FIELD

This disclosure is related to controlling output torque in a hybrid powertrain system.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

An engine and an electric machine are operative to communicate tractive power with a transmission device to control output power to an output member. The electric machine is electrically coupled to an energy storage device. A method for controlling the engine and electric machine includes monitoring an operator request for power, monitoring a state of charge of the energy storage device, determining an operating cost for each of a plurality of candidate engine operating points based on the operator request for power and the state of charge of the energy storage device; and operating the engine at the candidate engine operating point having a preferred operating cost.

BRIEF DESCRIPTION OF THE DRAWINGS

One or more embodiments will now be described, by way of example, with reference to the accompanying drawings, in which:

FIGS. 3, 4 and 5 are schematic flow diagrams of a control system architecture for controlling and managing torque in a powertrain system, in accordance with the present disclosure;

DETAILED DESCRIPTION

Figure 1:
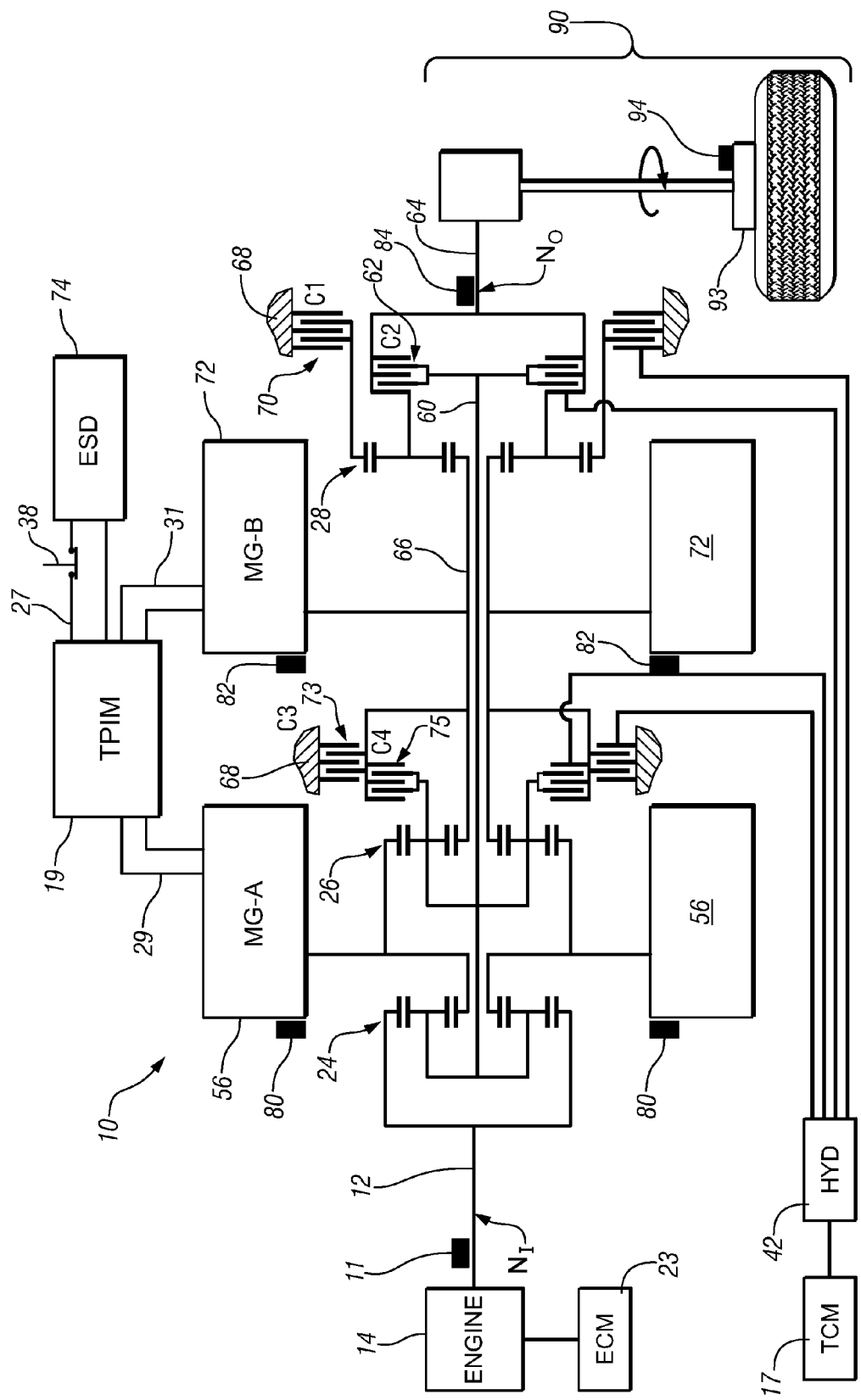
FIG. 1 is a schematic diagram of an exemplary powertrain, in accordance with the present disclosure.
Figure 2:
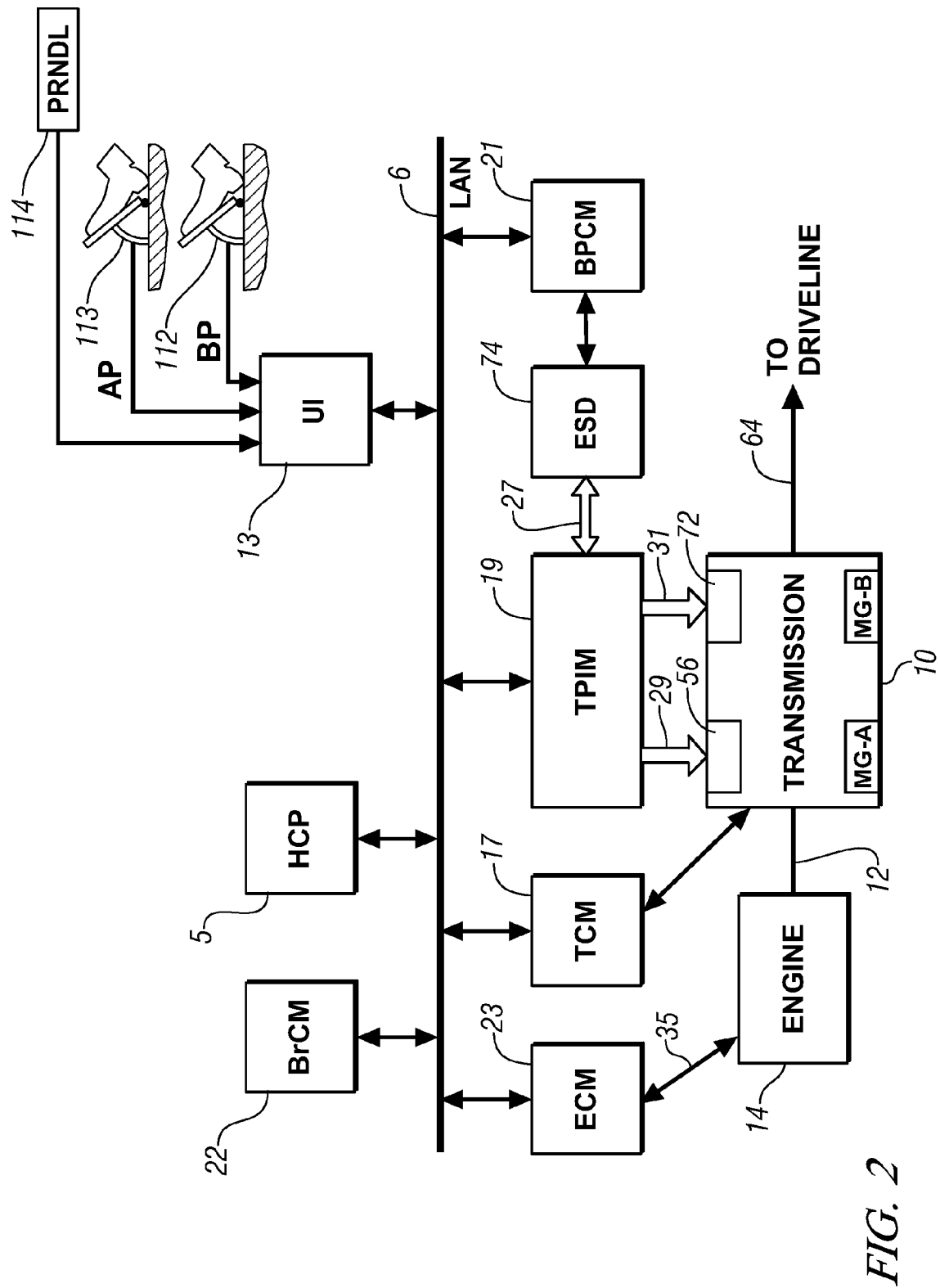
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle destabilization. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
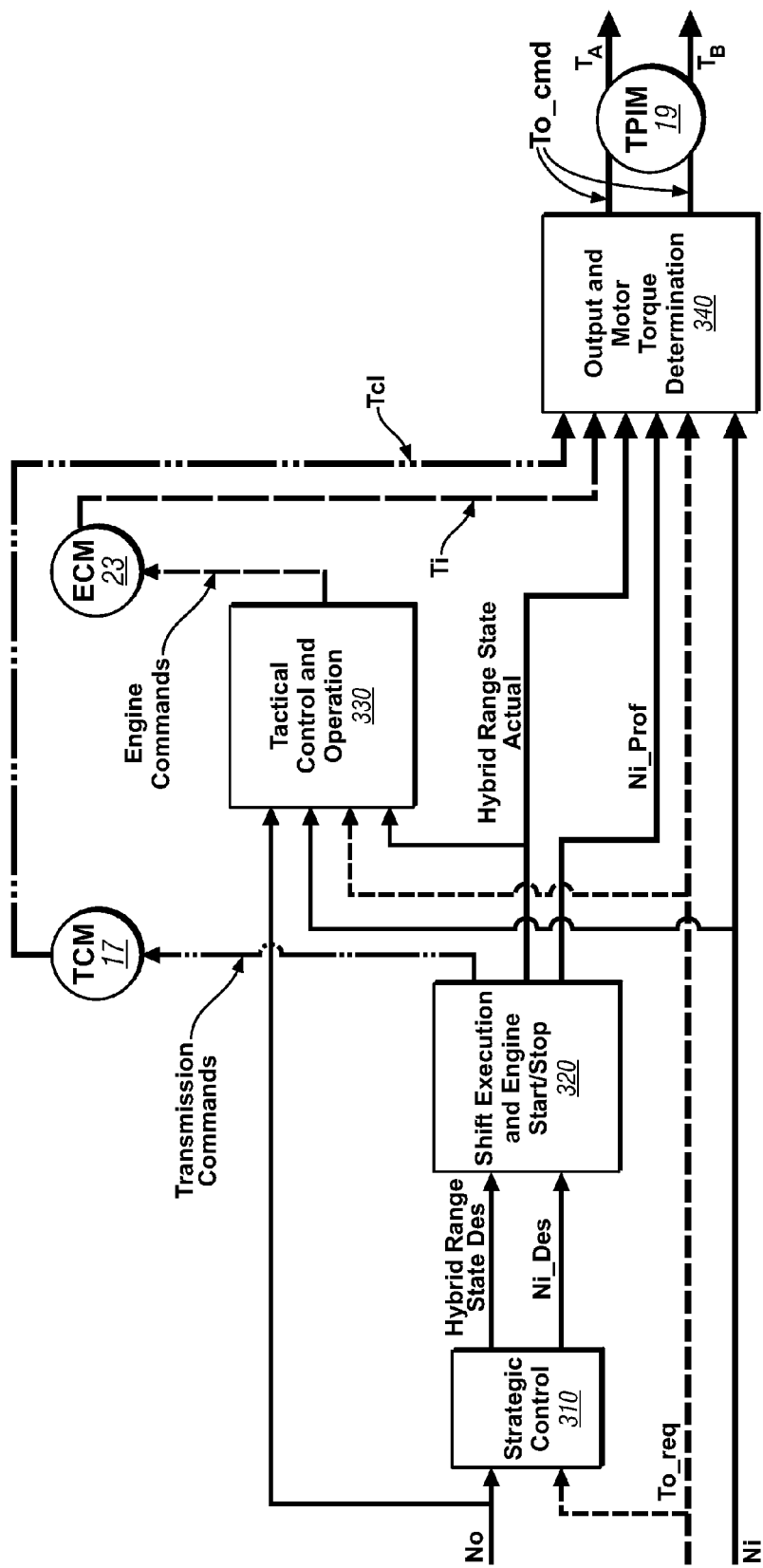

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines.

In operation, the operator inputs to the accelerator pedal 113 and the brake pedal 112 are monitored to determine the operator torque request ('To_req'). The operator inputs to the accelerator pedal 113 and the brake pedal 112 comprise individually determinable operator torque request inputs including an immediate accelerator output torque request, a predicted accelerator output torque request, an immediate brake output torque request, a predicted brake output torque request, and an axle torque response type. As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

A strategic control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic control scheme 310. The strategic control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and fuel cutoff, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that preferably meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

FIG. 4 depicts an engine operating point determination function 400 ('Engine Operating Point Determination') for determining an engine operating point to control the engine 14 such that the engine 14, along with the first and second electric machines 56 and 72, can communicate tractive power with the transmission 10 to control output power $P_O$, that is output speed $N_O$ and output torque $T_O$, to the output member 64. The engine operating point determination function 400 is described herein with respect to the exemplary two-mode hybrid powertrain system having first and second electric machines 56 and 72, but can also be utilized by other exemplary hybrid powertrain systems, for example, in a hybrid powertrain system utilizing one electric machine (not shown) and in a belt alternator starter (hereafter, BAS) hybrid powertrain system (not shown).

In each of the exemplary types of hybrid powertrain systems, the engine operating point determination function 400 determines an engine operating point ('Engine Operating Point') based upon an operator request for power ('Request for Power'), based upon operating condition measurements ('Operating Condition Measurements'), and based upon the state of charge of the ESD 74 ('$SOC_{BAT}$'). The engine operating point determination function 400 determines a preferred engine operating point and a preferred operating point for the second torque generating device based on energy efficient operation of the powertrain system and the operator request for power. In the exemplary two-mode hybrid powertrain system, both the engine 14 and the second torque generating device (for example, the first or second electric machine 56 or 72) directly communicate tractive power with the transmission 10 to provide an output power $P_O$ from the transmission 10 to the output member 64. In the BAS hybrid powertrain (not shown), an engine (not shown) directly communicates tractive power with a transmission (not shown) by providing input power to the transmission, and the second torque generating device (not shown) directly communicates power with the engine and indirectly communicates power with the transmission through the engine. Thus, in the exemplary BAS hybrid powertrain system the output power $P_O$ from the transmission to the output member is directly proportional to an input power $P_I$ from the engine to the transmission for each operating range state of the transmission.

The operator request for power inputted to the engine operating point determination function 400 can comprise the operator torque request when utilized in a torque request controlled system such as described above for the exemplary two-mode hybrid powertrain system. The operating condition measurements inputs to the engine operating point determination function 400 can include ambient operating conditions and powertrain system operating conditions. The powertrain system operating conditions can include engine operating conditions, for example, engine state, input speed, and input torque; transmission operating range state; electric machine operating conditions, for example, electric machine motor torques and electric machine temperatures; and energy storage device operating conditions for example, battery voltage, battery temperature, and available battery power.

The engine operating point can include engine states, tractive output levels, and operating conditions of the engine 14. The tractive output levels can include one or more of the input speed $N_I$, the input torque $T_I$, and the input power $P_I$ to the transmission 10. For example, in the exemplary two-mode hybrid powertrain system, the method 400 is utilized within the strategic control scheme 310 to determine an engine operating point comprising the input speed $N_I$, and is utilized within the tactical control scheme 330 to determine an engine operating point comprising the input torque T, and the engine state as will be described in further detail below.

FIG. 5 depicts an engine state and torque determination function 500 of the tactical control scheme 330. The engine state and torque determination function 500 includes an optimization function 502 and an engine state and engine torque selection function ('Engine State and Torque Selection') 504. The torque determination function 500 acts on substantially steady-state inputs to select a preferred engine state ('Preferred Engine State') and determine a preferred input torque from the engine 14 to the transmission 10. Inputs to the optimization scheme 502 include inputs that originate in the shift execution and engine start/stop control scheme 320 including a lead operating range state of the transmission 10 ('Lead Hybrid Range State') a lead predicted input acceleration profile ('Lead Input Acceleration Profile Predicted'), and a predicted range of clutch reactive torques ('Predicted Clutch Reactive Torque Min/Max') across each applied clutch in the lead operating range state. The optimization scheme 502 further inputs the predicted accelerator output torque, the predicted electric power limits ('Predicted Electric Power Limits') for the ESD 74, the state-of-charge ('$SOC_{BAT}$') of the ESD 74 as measured by the BPCM 21, the output speed ('$N_O$') of the transmission 10 as measured by the output transmission speed sensor 84, and ambient air pressure and air temperature. A present speed of the input member 12, i.e., Ni, is determined and utilized along with the present operating range state of the transmission 10 to determine the lead operating range state of the transmission 10 and the predicted range of clutch reactive torques.

The lead operating range state of the transmission 10 comprises a time-shifted lead of the operating range state of the transmission 10 to accommodate a response time lag between a commanded change in the operating range state and the actual operating range state. Thus, the lead operating range state of the transmission 10 is the commanded operating range state. The lead predicted input acceleration profile comprises a time-shifted lead of the predicted input acceleration profile of the input member 12 to accommodate a response time lag between a commanded change in the predicted input acceleration profile and a measured change in the predicted input acceleration profile. Thus, the lead predicted input acceleration profile is the predicted input acceleration profile of the input member 12 occurring after the time shift. The parameters designated as 'lead' are used to accommodate concurrent transfer of torque through the powertrain converging at the common output member 64 using devices having varying response times. Specifically, the engine 14 can have a response time of an order of magnitude of 300-600 ms, and each of the torque transfer clutches C1 70, C2 62, C3 73, and C4 75 can have response times of an order of magnitude of 150-300 ms, and the first and second electric machines 56 and 72 can have response time of an order of magnitude of 10 ms. The predicted electric power limits comprise a preferred operating range of output power $P_{BAT}$ for operating the ESD 74. Operator inputs to the accelerator pedal 113 and to the brake pedal 112 are monitored to determine the operator torque request, which are shaped with the axle torque response type through a predicted output torque shaping filter (not shown) to yield a net predicted output torque ('not shown') and the lead predicted input acceleration profile.

The optimization scheme 502 utilizes the inputs in a function for determining the preferred input torque and associated operating cost for operating the engine in the fueled, all-cylinder state ('Fueled, All-Cylinder Preferred Ti Determination') (512), a function for determining the input torque and associated operating cost for operating the engine in the fuel cutoff, all-cylinder state ('Fuel Cutoff, All-Cylinder Ti Calculation') (514), a function for determining the preferred input torque and associated operating cost for the operating the engine in the fueled, cylinder deactivation state ('Fueled, Cylinder Deac Preferred Ti Determination') (516), and a function for determining the input torque and associated operating cost for operating in the fuel cutoff, cylinder deactivation state ('Fuel Cutoff, Cylinder Deac Calculation').

The function for determining the preferred input torque for operating the engine 14 in the fueled, all-cylinder state 512 and the function for determining the input torque for operating the engine fueled, cylinder deactivation state 516 utilize optimization functions, wherein each optimization function determines a search range of permissible input torques and iteratively evaluates costs for candidate input torques within the search range. Each optimization function selects as a preferred engine operating point the candidate input torque having the lowest cost after a calibrated number of iterations.

The function for determining the preferred input torque for operating the engine 14 in the fueled, all-cylinder state 512 outputs the preferred input torque for operating the engine 14 in the fueled, all-cylinder state ('Input Torque Full') and the corresponding operating cost $P_{COST\ FULL\ FUEL}$.

The function for determining the input torque for operating the engine 14 in the fuel cutoff, all-cylinder state 514 outputs the input torque for operating the engine 14 in the fuel cutoff, all-cylinder state ('Input Torque Full FCO') and the corresponding operating cost $P_{COST\ FULL\ FCO}$.

The function for determining the preferred input torque for operating in the engine 14 in the fueled, cylinder deactivation state 516 outputs the input torque for operating the engine 14 in the fueled, cylinder deactivation state ('Input Torque DEAC') and the corresponding operating cost $P_{COST\ DEACT\ FUEL}$.

The function for determining the preferred input torque for operating in the engine 14 in the fuel cutoff, cylinder deactivation state 518 outputs the input torque for operating the engine 14 in the fuel cutoff, cylinder deactivation state ('Input Torque DEAC FCO') and the corresponding operating cost $P_{COST\ DEACT\ FCO}$.

The above described operating costs, i.e., $P_{COST\ FULL\ FUEL}$, $P_{COST\ FULL\ FCO}$, $P_{COST\ DEACT\ FUEL}$, and $P_{COST\ DEACT\ FCO}$ are calculated as a total powertrain power cost $P_{LOSS\ TOTAL}$, which is determined utilizing equation 1 below.

$$P_{LOSS\ TOTAL} = P_{LOSS\ MECH} + P_{LOSS\ BRAKE} + P_{LOSS\ MOTOR} + P_{LOSS\ ENG} + P_{LOSS\ SOC\ FUEL} + P_{LOSS\ BAT} + P_{LOSS\ SOC\ PBAT} \quad [1]$$

Power loss from the transmission 10 includes mechanical power loss costs ('$P_{LOSS\ MECH}$') and can further include brake power loss costs ('$P_{LOSS\ BRAKE}$') when negative torque from the friction braking system is transferred to the driveline 90. The mechanical power loss costs $P_{LOSS\ MECH}$ comprise transmission spin losses determined based upon the input speed $N_I$ of the engine 14, the output speed $N_O$ to the output member 64, and the operating range state of the transmission 10. The spin torque loss can be modeled as viscous drag wherein a drag torque is proportional to the output speed $N_O$.

The brake power loss costs $P_{LOSS\ BRAKE}$ are determined based upon a braking torque of the braking system. The brake power loss comprises a difference between the output torque $T_O$ provided by the powertrain system multiplied by the output speed $N_O$ and the net output torque request based upon the operator inputs to the accelerator pedal 112 and the brake pedal 113 multiplied by the output speed $N_O$. The brake power is an amount of power that is absorbed by the brake system to supplement the powertrain system to meet the operator torque request.

The electric motor power loss cost ('$P_{LOSS\ MOTOR}$') includes power loss from the first and second electric machines 56 and 72. The electric motor power loss cost $P_{LOSS\ MOTOR}$ can be determined based on the motor torques $T_A$ and $T_B$ and motor speeds $N_A$ and $N_B$. Motor electric power is calculated using predetermined coefficients and the motor torques $T_A$ and $T_B$. The predetermined coefficients are preferably developed and tabulated as a function of the motor speeds $N_A$ and $N_B$. Motor power loss comprises the electric power supplied to the first and second electric machines 56 and 72 minus mechanical power generated by the first and second electric machines 56 and 72.

Power losses from the engine 14 include an engine power loss cost ('$P_{LOSS\ ENG}$') and an engine power loss state of charge biasing factor ('$P_{LOSS\ SOC\ FUEL}$'). The engine power loss cost $P_{LOSS\ ENG}$ comprises a power loss for fuel consumption by the engine 14. The engine power loss cost $P_{LOSS\ ENG}$ is determined utilizing equation 2, below:

$$P_{LOSS\ ENG} = C_{MEPPFF} \cdot \dot{m}_{FUEL} - P_{ENG} \quad [2]$$

wherein $C_{MEPPFF}$ is a fuel power cost factor based upon the filtered output power to the output member 64 requested by the operator. The filtered output power is calculated by multiplying the predicted accelerator output torque request by the output speed $N_O$ and then filtering the result. A mass fuel flow level $\dot{m}_{FUEL}$ and an engine output power $P_{ENG}$ are determined based upon the engine operating point.

The engine power loss state of charge biasing factor $P_{LOSS\ SOC\ FUEL}$ biases the power loss for fuel power consumption by the engine 14 based on the state of charge of the ESD 74 relative to a preferred state of charge. The engine power loss state of charge biasing factor $P_{LOSS\ SOC\ FUEL}$ is determined utilizing equation 3 below:

$$P_{LOSS\ SOC\ FUEL} = C_{SOC\ FUEL} \cdot \dot{m}_{FUEL} \quad [3]$$

An engine power state of charge cost factor $C_{SOC\ FUEL}$ can be determined based on the battery state of charge $SOC_{BAT}$ and either the output power $P_O$ or the output speed $N_O$ from the transmission 10 to the output member 92.

Figure 6:
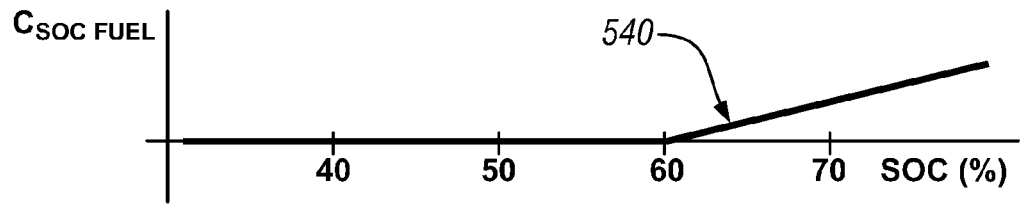
FIG. 6 graphically depicts an engine power state of charge cost factor versus state of charge of an energy storage device, in accordance with the present disclosure.

FIG. 6 depicts a profile 540 of the engine power state of charge cost factor ('$C_{SOC\ FUEL}$') as a function of battery state of charge ('$SOC_{BAT}$ (%)') for an exemplary system. The engine power state of charge cost factor increases with increasing state of charge $SOC_{BAT}$ when the state of charge $SOC_{BAT}$ is greater than a threshold state of charge, for example, sixty percent state-of-charge. As the engine power state of charge cost factor $C_{SOC\ FUEL}$ increases, engine costs increase, thereby increasing a ratio of power supplied by the ESD 74 to power supplied by engine 14.

Figure 7:
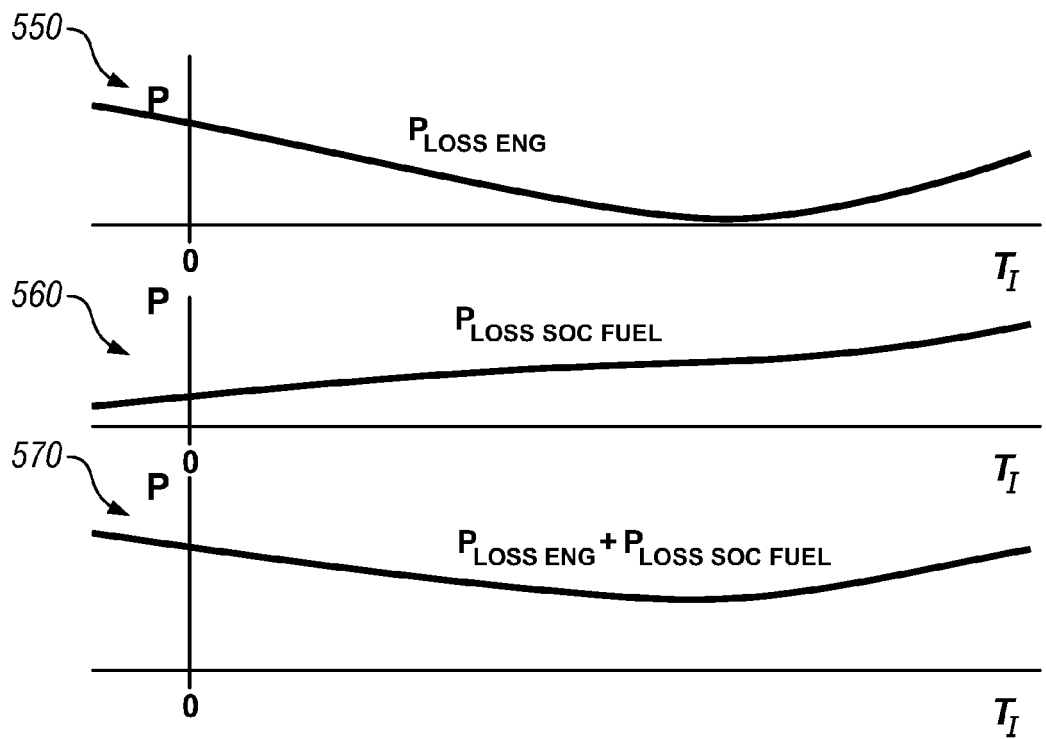
FIG. 7 graphically depicts an engine power loss profile, an engine power loss biasing factor profile, and a total power loss profile, in accordance with the present disclosure.

FIG. 7 depicts power costs ('P') versus input torque ('$T_I$') from the engine 14 for engine power loss ('$P_{LOSS\ ENG}$') profile 550, the battery power state of charge biasing factor ('$P_{LOSS\ SOC\ FUEL}$') profile 560, and a total engine power loss ('$P_{LOSS\ ENG} + P_{LOSS\ SOC\ FUEL}$') profile 570 comprising a sum of the engine power loss and the battery power state of charge biasing factor.

Power losses from the ESD 74 include a battery power loss $P_{LOSS\ BAT}$ and a battery power loss state of charge biasing factor $P_{LOSS\ SOC\ PBAT}$. The battery power loss $P_{LOSS\ BAT}$ is an amount of power loss that occurs while charging or discharging ESD 74. The battery power loss $P_{LOSS\ BAT}$ is determined from the estimated battery power utilizing a Thevenin equivalent battery model utilizing equation 4 below:

$$P_{LOSS\ BAT} = I^2 \cdot R_T \quad [4]$$

wherein $R_T$ is a Thevenin equivalent resistance of the battery, and

I is the battery current and is a function of the battery power $P_{BAT}$.

A lookup table is utilized to determine the battery power loss $P_{LOSS\ BAT}$ as a function of the battery power $P_{BAT}$.

The battery power loss state of charge biasing factor is determined utilizing equation 5 below:

$$P_{LOSS\ SOC\ BAT} = C_{SOC\ NEG\ PBAT} \cdot \min(P_{BAT} + P_{BAT\ SHIFT}, 0) + \quad [5]$$
$$C_{SOC\ POS\ PBAT} \cdot \max(P_{BAT} + P_{BAT\ SHIFT}, 0)$$

A positive battery state of charge cost factor $C_{SOC\ POS\ PBAT}$, a negative state of charge cost factor $C_{SOC\ POS\ PBAT}$, and a battery shift state of charge cost factor $P_{BAT\ SHIFT}$ can each be determined based on either the state of charge $SOC_{BAT}$ and the output speed $N_O$, or the state of charge $SOC_{BAT}$ and the output power $P_O$.

Figure 8:
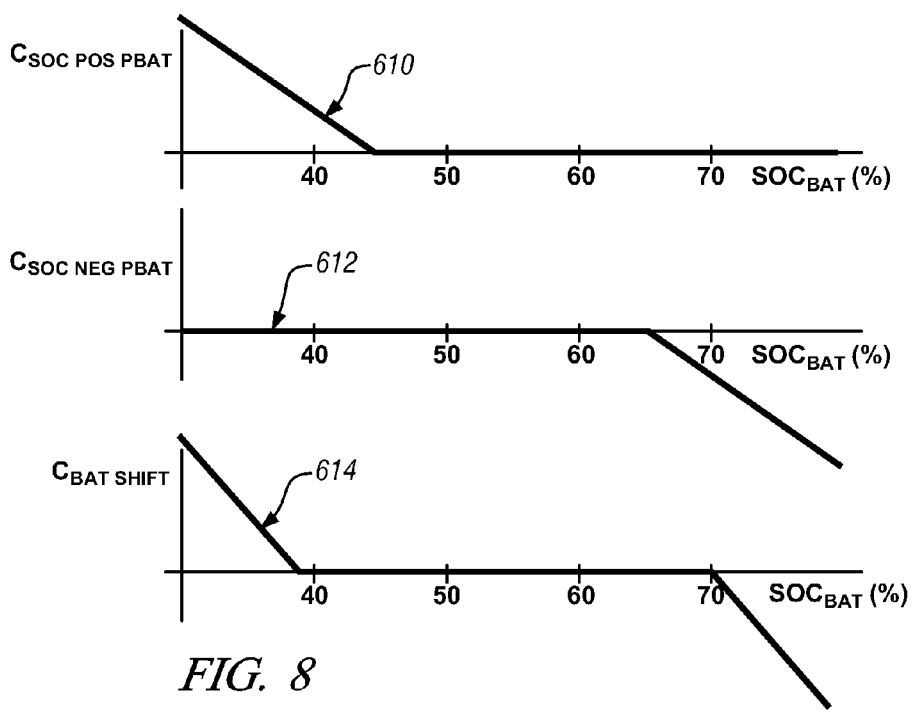
FIG. 8 graphically depicts an energy storage device positive state of charge cost factor, an energy storage device negative state of charge cost factor, and an energy storage device shift state of charge cost factor versus state of charge of an energy storage device, in accordance with the present disclosure.

FIG. 8 depicts a profile 610 of the positive battery state of charge cost factor ('$C_{SOC\ POS\ PBAT}$'), a profile 612 of the negative battery state of charge cost factor ('$C_{SOC\ NEG\ PBAT}$'), and a profile 614 of the battery shift state of charge cost factor ('$C_{BAT\ SHIFT}$'), versus the state of charge ('$SOC_{BAT}$(%)'). The positive battery state of charge cost factor $C_{SOC\ POS\ PBAT}$ increases with decreasing state of charge when the state of charge is less than a threshold state of charge, for example, forty-five percent state of charge. As the positive battery state-of-charge cost factor $C_{SOC\ POS\ PBAT}$ increases, the battery state of charge biasing factor $P_{LOSS\ SOC\ PBAT}$ increases discharging cost, thereby decreasing a ratio of power supplied by the ESD 74 to power supplied by engine 14. The negative state of charge cost factor $C_{SOC\ NEG\ PBAT}$ decreases with increasing state of charge when the state of charge is greater than a threshold state of charge, for example, sixty-five percent state of charge. As the negative state of charge cost factor $C_{SOC\ NEG\ PBAT}$ decreases, the battery state of charge biasing factor $P_{LOSS\ SOC\ PBAT}$ increases charging cost, thereby increasing a ratio of power supplied by the ESD 74 to power supplied by engine 14. The battery shift state of charge cost factor $C_{BAT\ SHIFT}$ increases with decreasing state of charge when the state of charge is less than a threshold state of charge, for example, forty-percent state of charge and decreases with increasing state of charge when the state of charge is greater than a threshold state of charge, for example, seventy percent state of charge. As the battery shift state of charge cost factor $C_{BAT\ SHIFT}$ increases, the battery power state of charge biasing factor $P_{LOSS\ SOC\ PBAT}$ increases discharging cost, thereby decreasing a ratio of power supplied by the ESD 74 to power supplied by engine 14. As the battery shift state of charge cost factor $C_{BAT\ SHIFT}$ decreases, battery power state charge biasing factor $P_{LOSS\ SOC\ PBAT}$ increases discharging cost, thereby increasing a ratio of power supplied by the ESD 74 to power supplied by engine 14.

Figure 9:
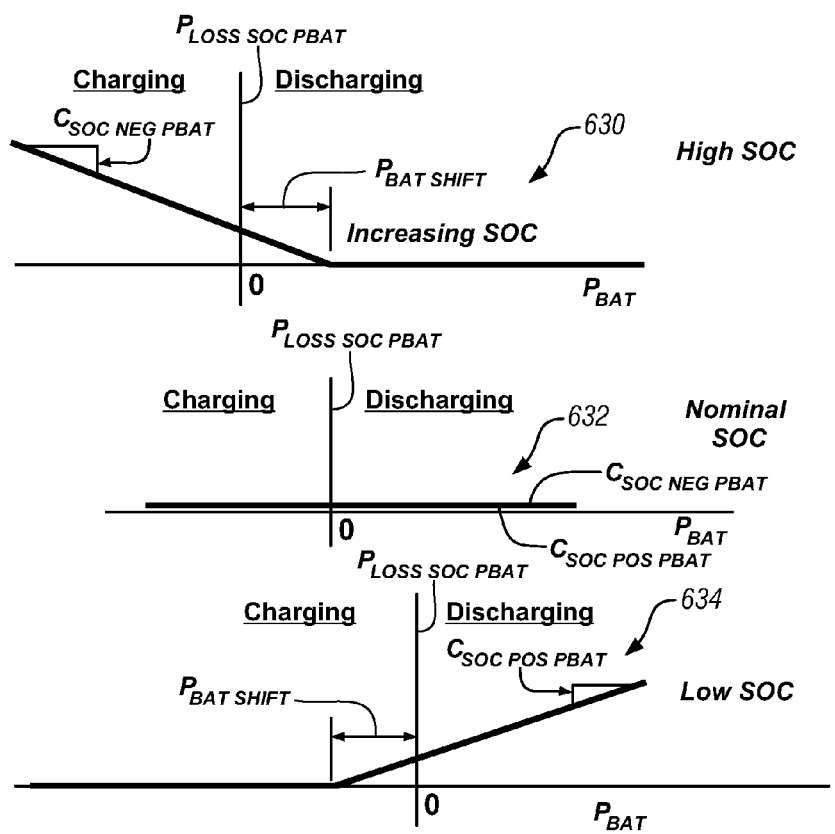
FIG. 9 graphically depicts energy storage device state of charge biasing factors versus energy storage device power for high, nominal, and low energy storage device state of charge levels, in accordance with the present disclosure.

FIG. 9 depicts the battery state of charge biasing factor $P_{LOSS\ SOC\ PBAT}$ as a function of the battery power output $P_{BAT}$, for charging and discharging operations, including when the ESD 74 has a high state of charge ('High SOC') (for example, greater than 65% state of charge), a nominal state of charge ('Nominal SOC'), (for example, between 45% state of charge and 65% state of charge), and a low SOC ('Low SOC') (for example, less than 45% state-of-charge). When the ESD 74 is in a high state of charge range (630), as battery power increases (indicated by an increasing state of charge), the battery power state of charge biasing factor $P_{LOSS\ SOC\ PBAT}$ increases for battery output powers $P_{BAT}$ less than a threshold battery power (primarily charging). When the ESD 74 is in the low SOC range (634), as the battery power decreases, indicated by decreasing state of charge, the battery power state of charge biasing factor $P_{LOSS\ SOC\ PBAT}$ increases for battery output powers $P_{BAT}$ greater than a threshold battery power (primarily discharging). When the ESD 74 is in the nominal state of charge range (632), the battery power state of charge biasing factor $P_{LOSS\_SOC\_PBAT}$ is a nominal or zero, non-changing value.

The engine state and engine torque selection function 504 inputs the input torque and associated operating costs along with the actual engine state ('Actual Engine State') and allowable engine states ('Engine State Allowed'). The allowable engine states includes enablement signals that notify the fuel optimization function whether each engine state is enabled and therefore, whether a transition to the candidate engine state is allowed. The enablement signals include a fueled, cylinder deactivation state enablement signal; a fuel cutoff, cylinder deactivation state enablement signal; and a fuel cutoff, all-cylinder state enablement signal. The fueled, all-cylinder state is continuously enabled.

The engine state and engine torque selection function 504 determines and outputs a preferred engine state ('Preferred Engine State') and a target input torque ('Target Input Torque') corresponding to the preferred input torque for the preferred engine state. The engine state and engine torque selection function 504 determines the preferred engine state as an engine state which the enablement signals indicate is enabled and which corresponds to the lowest cost among the set of engine operating costs.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. Method for controlling an engine and an electric machine operative to communicate tractive power with a transmission device to control output power to an output member, said electric machine electrically coupled to an energy storage device, the method comprising:
   monitoring an operator request for power;
   monitoring a state of charge of the energy storage device;
   determining an operating cost for each of a plurality of candidate engine operating points for each of a plurality of candidate engine states based on the operator request for power and the state of charge of the energy storage device;
   selecting a preferred engine state and a corresponding preferred engine operating point based on the operating costs of the candidate engine operating points for the candidate engine states; and
   operating the engine at the preferred engine state and the corresponding preferred engine operating point.

2. The method of claim 1, wherein determining the operating cost for each of the plurality of candidate engine operating points for each of the plurality of candidate engine states based on the operator request for power and the state of charge of the energy storage device comprises determining an engine power loss cost for each of the plurality of candidate engine operating points.

3. The method of claim 2, wherein determining the operating cost for each of the plurality of candidate engine operating points for each of the plurality of candidate engine states based on the operator request for power and the state of charge of the energy storage device further comprises determining an engine power loss cost biasing factor based upon the state of charge of the energy storage device.

4. The method of claim 3, wherein determining the operating cost for each of the plurality of candidate engine operating points for each of the plurality of candidate engine states based on the operator request for power and the state of charge of the energy storage device further comprises determining a battery power loss cost.

5. The method of claim 4, wherein determining the operating cost for each of the plurality of candidate engine operating points for each of the plurality of candidate engine states based on the operator request for power and the state of charge of the energy storage device further comprises determining a battery power cost biasing factor based upon the state of charge of the energy storage device.

6. The method of claim 1, wherein determining the operating cost for each of the plurality of candidate engine operating points for each of the plurality of candidate engine states based on the operator request for power and the state of charge of the energy storage device comprises determining a mechanical power loss cost, an electric machine power loss cost, and a braking power loss cost.

7. The method of claim 1, wherein selecting the preferred engine state and the corresponding preferred engine operating point based on the operating costs of the candidate engine operating points for the candidate engine states further comprises:
   determining a search range of engine operating points for each of the candidate engine states;
   executing a search function within the search range to select candidate engine operating points within the search range for each of the candidate engine states based on operating costs;
   and
   selecting the preferred engine state and the corresponding preferred engine operating point as the candidate engine operating point for the candidate engine states having the lowest operating cost.

8. The method of claim 7, wherein determining a search range of engine operating points for each of the candidate engine states comprises determining search ranges of engine operating points for engine states comprising a fueled engine state and a fuel cutoff engine state.

9. The method of claim 1, wherein monitoring the operator power request comprises monitoring an operator torque request.

10. The method of claim 1, further comprising:
    determining a preferred electric machine torque based on the preferred engine state and the corresponding preferred engine operating point, and
    operating the electric machine based on the preferred electric machine torque.

11. The method of claim 1, wherein the engine operating point comprises an engine input torque to the transmission device.

12. Method for controlling an engine and an electric machine to communicate tractive power with a transmission device to control power to an output member, said electric machine electrically coupled to an energy storage device, the method comprising:
    monitoring an operator request for power;
    monitoring a state of charge of the energy storage device;
    selecting a candidate engine operating point for each of a plurality of candidate engine states;
    determining an operating cost for each of the candidate engine operating points for each of the plurality of candidate engine states based on the operator request for power and the state of charge of the energy storage device; and operating the engine at the candidate engine operating point and the candidate engine state corresponding to a preferred operating cost.

13. The method of claim 12, wherein the candidate engine states comprise a fueled engine state and a fuel cutoff engine state.

14. The method of claim 12, wherein selecting the candidate engine operating point for the fueled engine state comprises determining a preferred engine operating point within a search range of candidate engine operating points.

15. The method of claim 12, wherein the candidate engine states comprise a fueled, all-cylinder state; a fuel cutoff, all-cylinder state; a fueled, cylinder deactivation state; and a fuel cutoff cylinder deactivation state.

16. The method of claim 12, wherein the engine operating point comprises one of an engine speed, an engine torque and an engine power.

17. Method for controlling an engine and an electric machine to communicate tractive power with a transmission device to control output power to an output member, said electric machine electrically coupled to an energy storage device, the method comprising:
monitoring an operator torque request;
monitoring a state of charge of the energy storage device;
determining operating costs for a plurality of candidate engine torques for a plurality of candidate engine states based on the operator request for power and the state of charge of the energy storage device; and
operating the engine at a selected one of the candidate engine states and a selected one of the candidate engine torques having a minimum operating cost.

* * * * *